T. SPACIE.

DRIVING AND STEERING DEVICE FOR MOTOR VEHICLES.

APPLICATION FILED JAN. 28, 1918.

Reissued May 14, 1918.

14,472.

3 SHEETS—SHEET 1.

Witness:

Fr. C. Davison

Inventor

Thomas Spacie

By Chas. J. Murray

Atty.

T. SPACIE.

DRIVING AND STEERING DEVICE FOR MOTOR VEHICLES.

APPLICATION FILED JAN. 28, 1918.

Reissued May 14, 1918.

14,472.

3 SHEETS—SHEET 2.

Witness:
Fred C. Brown

Inventor
Thomas Spacie
By Chas F. Murray Atty.

T. SPACIE.
DRIVING AND STEERING DEVICE FOR MOTOR VEHICLES.
Reissued May 14, 1918. APPLICATION FILED JAN. 28, 1918.
14,472.
3 SHEETS—SHEET 3.
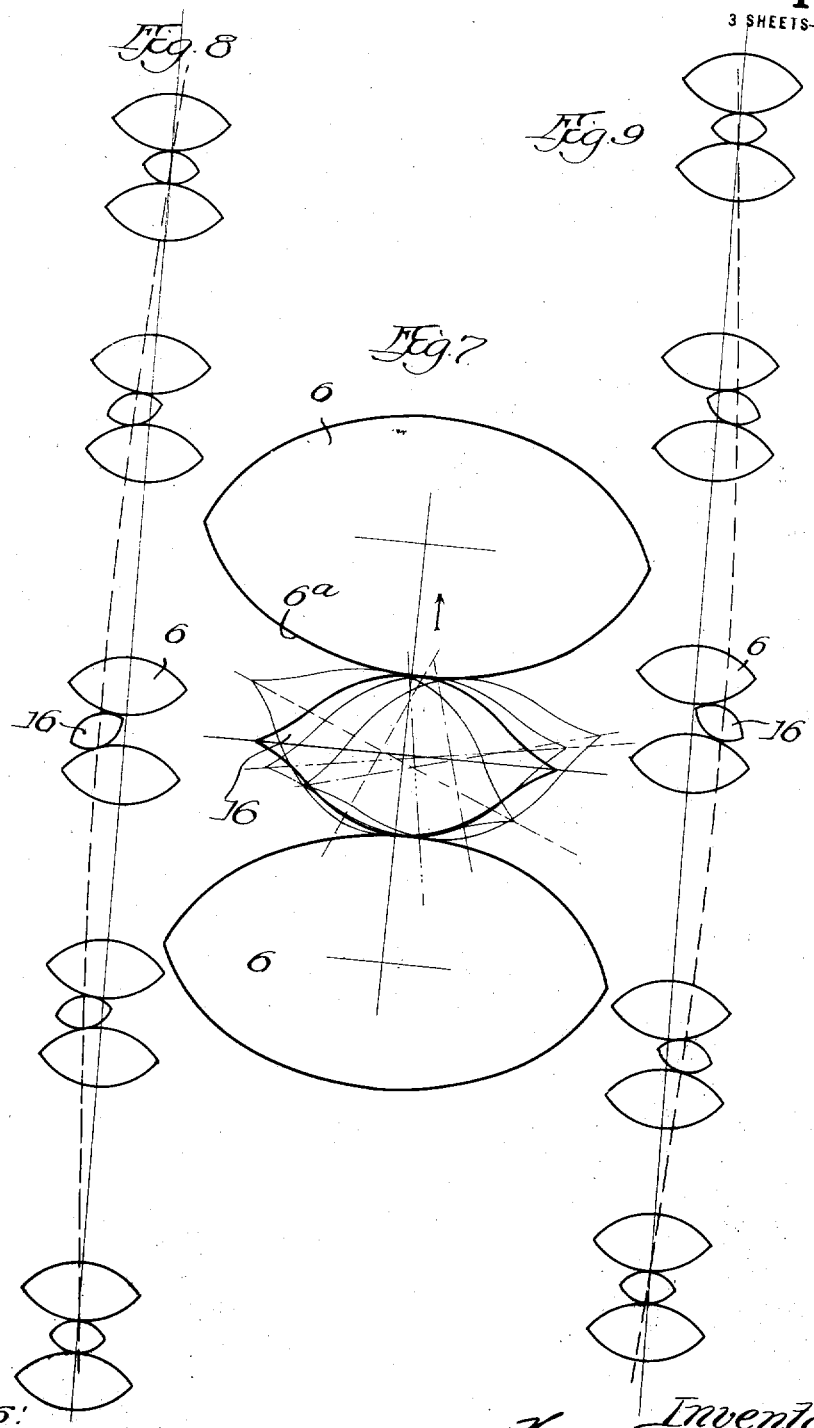
Witness:
Geo. C. Dorson
Inventor
Thomas Spacie
by Chas. F. Murray
His Atty

UNITED STATES PATENT OFFICE.

THOMAS SPACIE, OF DE KALB, ILLINOIS.

DRIVING AND STEERING DEVICE FOR MOTOR-VEHICLES.

14,472. Specification of Reissued Letters Patent. Reissued May 14, 1918.

Original No. 1,188,854, dated June 27, 1916, Serial No. 799,594, filed November 6, 1913. Application for reissue filed January 28, 1918. Serial No. 214,210.

*To all whom it may concern:*

Be it known that I, THOMAS SPACIE, a citizen of the United States, and resident of De Kalb, in the county of Dekalb and State of Illinois, have invented certain new and useful Improvements in Driving and Steering Devices for Motor-Vehicles, of which the following is a specification.

This invention relates to improvements in a driving and steering device or mechanism for motor vehicles.

The object of the invention is to provide a new and improved driving and steering device for motor vehicles, so arranged thereupon as to permit driving the vehicle or turning the same into any angular position for steering purposes, the device being simple and durable in construction, easily manipulated and arranged to effectively transmit the power and reduce the friction to a minimum.

One of the principal objects of my invention is to provide novel driving and steering apparatus so arranged that the contacting lugs on the driving and driven members shall be in rolling engagement instead of in sliding engagement. This is of relatively great advantage in reducing the frictional resistance to steering and reducing the loss in power whenever the wheels are turned to a position other than one at right angles to the driving axle. A further object is to so construct said parts that there is no tendency of the driving member to urge the driven wheel into its normal position. In any structure in which this occurs, particularly if large and heavy parts are employed, it is practically impossible to shift the driven wheel into abnormal position without first freeing it from the driving force.

Another object in my invention is to provide driving and driven members adapted for relative angular movement and so arranged that all the inter-engaging lugs shall be in contact in whatever angular position the parts may assume. This is not possible in any construction in which one of the inter-engaging lugs has a fixed point of contact. The lugs must be so designed that at each position following an angular disposition of the driving and driven members, different points of the driving and driven lugs are in contact. A collateral advantage of a construction such as described will be that both edges of the driving and driven lugs will always be in contact and there will be no opportunity for backlash upon a reversal of rotation of one of the parts. The most usual situation is that the rotation is reversed while the driven member is in cramped position, as for instance, when turning around. In that situation the driving motion is alternately forward and back while the steering wheels are turned and it is eminently desirable that there shall be no clearance or backlash permitted between the driving and driven members.

In describing my invention in detail reference will be had to the accompanying drawings wherein like characters denote like or corresponding parts throughout the several views, and in which.

Figure 1:
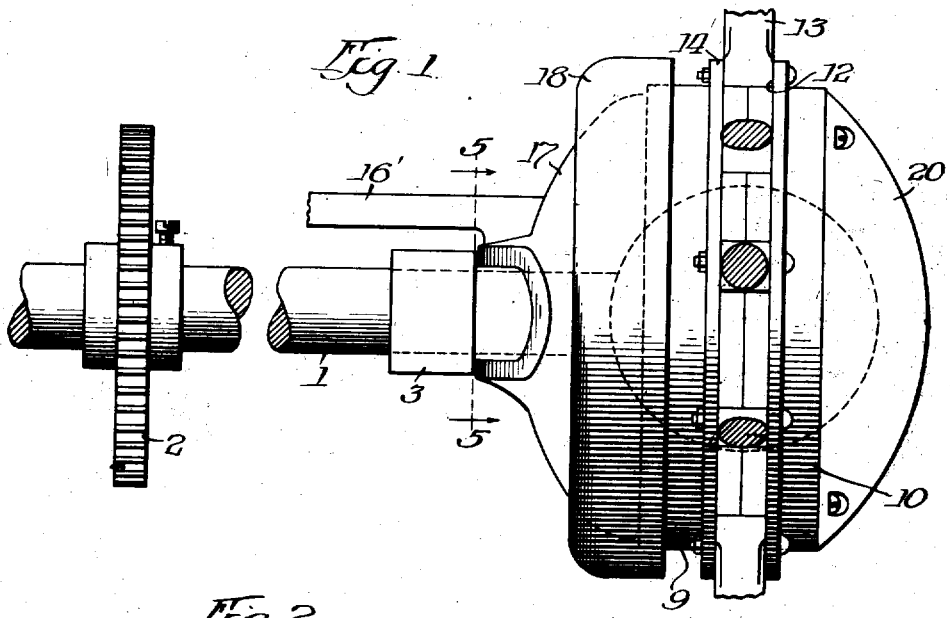
Figure 1 is a side elevation, the axle being partly broken away, illustrating the mechanism comprising the present invention.

Fig. 7 is a diagrammatic developed view showing the different positions assumed by the driving and driven lugs in one cycle of rotation of the parts when the driven member is in an angular position, and, Figs. 8 and 9, when placed end to end, show diagrammatically the positions assumed by the coöperating parts at various points during one cycle when the driven member is in an extreme angular position.

Before proceeding with the description of the drawings, I desire to call particular attention to the fact that while I have evolved my invention with particular reference to its application in connection with motor vehicles, the same may be readily utilized as a driving and steering device for marine vessels, traction engines, flying machines and various other vehicles of the self-propelled type.

Referring now to the drawings wherein is illustrated the preferred embodiment of my invention, the numeral 1 designates the front axle of the motor vehicle in connection with which the present invention is employed, the said axle having associated therewith a driving gear 2, whereby motion is imparted thereto. A bearing 3, of any suitable construction is provided for the said axle 1.

Formed integrally with the axle 1, or fixedly secured thereto, I provide a ball member designated as an entirety by the numeral 4, the ends of the ball being flattened, as at 5, while the periphery is provided with a plurality of preferably four, integrally formed concavo-convex ridges or extensions 6, thereby providing grooves or recesses 7, the purpose of which will subsequently appear.

Figure 2:
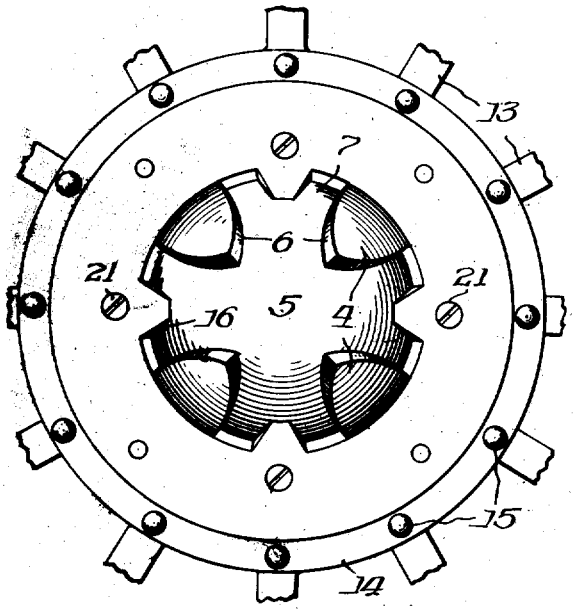
Fig. 2 is an end view with the cap removed.
Figure 3:
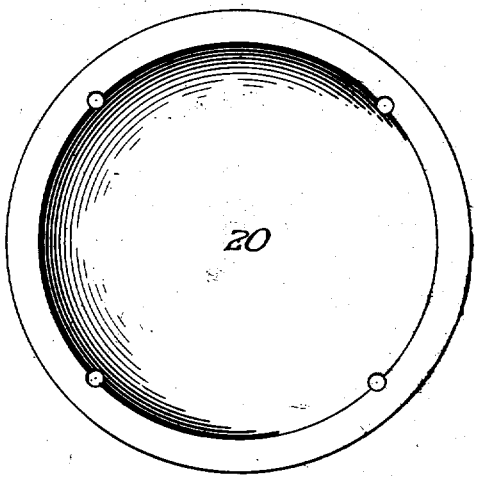
Fig. 3 is an elevation of the cap.

Arranged to embrace the ball member 4, and to partially inclose the same, I provide a socket member designated as an entirety by the numeral 8, the said member in its preferred embodiment comprising a pair of annular socket sections 9 and 10 respectively, the said two sections being detachably yet rigidly secured through the medium of screws or bolts 11, extending transversely therethrough. The meeting faces of each of the said sections are cut away as at 12, to provide an annular groove within which the spokes 13, are seated; annular flanges 14, being formed integrally with each of the said socket sections, the said flanges engaging the said spokes 13, to provide a securing element therefor when taken in connection with the screws 15, extending transversely therethrough and through the said spokes as is illustrated to advantage in Figs. 1, 2 and 4 of the drawings. Extensions or ridges 16, are formed integrally with and project from the inner periphery of the said socket member 8, the said extensions fitting one within each of the recesses 7, formed within the ball member 4, thereby effecting substantially a ball and socket connection for the wheels (not shown) supported by the spokes 13, forming a part thereof.

A casing is provided for the ball member 4, the said socket 8, forming a part thereof, which socket is supported or maintained in frictional engagement with an enlargement 17, of the steering arm, designated 16′, the said enlargement forming a part of the said casing. A band or collar 18, is arranged to overlap, embrace and frictionally engage the enlargement 17, the said band being secured upon, as at 19, and carried by one of the socket sections 9, to provide for the maintenance of the same in engagement with the ball member 4, and in operative relation with the enlargement 17, the said band serving in the capacity of a support or connecting means for the said socket.

Figure 4:
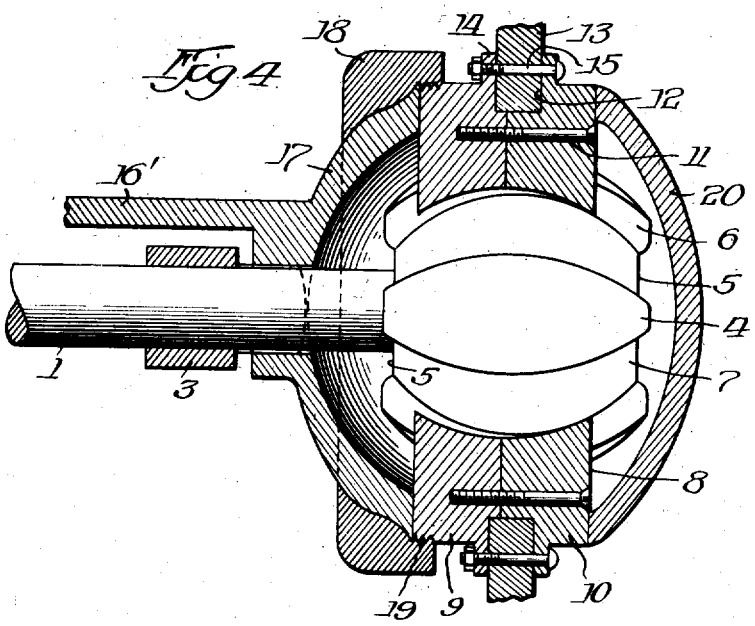
Fig. 4 is a longitudinal sectional view of the mechanism illustrated in Fig. 1.
Figure 5:
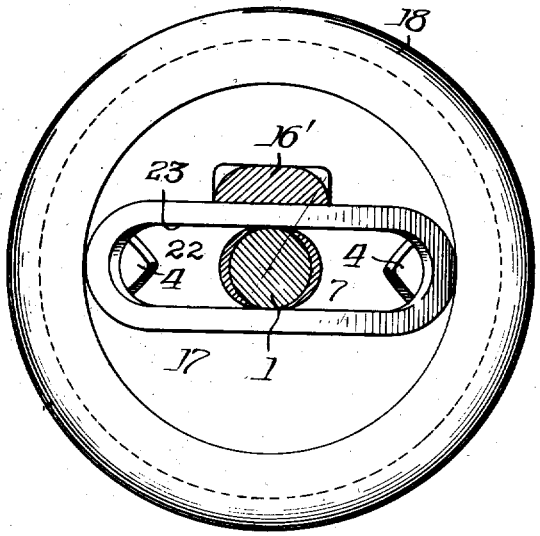
Fig. 5 is a section on the line 5—5 of Fig. 1.
Figure 6:
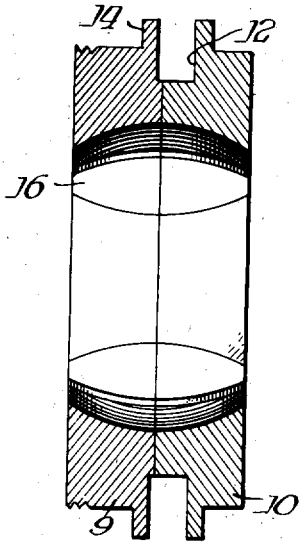
Fig. 6 is a longitudinal sectional view of the socket plate.

The inner periphery of the collar or band 18, is preferably shaped to conform to the configuration of a portion of the outer face of the enlargement or casing section 17, this being illustrated to advantage in Fig. 4, of the drawings. A cap 20, is detachably secured by means of screws or other means 21, to the socket section 10, the said cap forming a casing section, which with the socket 8, and the enlargement 17, effects a housing or casing within which the ball member 4, is inclosed. The inner face of both the enlargement 17, and the cap 20, are concaved as shown. An elongated opening 22, is formed within the enlargement 17, through which the axle 1, of the vehicle extends, the provision of the opening 22, permitting the steering arm 16, to be swung at an angle to the axle and thus provide for the steering feature of the device.

It will be noted that the elongated, horizontal opening 22, engages with the flattened portion 23, of the bearing 3, and holds the part 17, from rotation with the wheel.

Fig. 7 is an accurate diagram showing different positions which the lugs will assume in one angular position of the driven member. It will be seen by reference to this figure that assuming a driving force applied in the direction of the arrow, that the lug 16, rolls on the surface 6ᵃ. This is determined by noting that the point of contact between the driving and driven lugs changes to the same extent on each member in each of the different positions. Of course, these points change an infinite number of times in one cycle, only a few of the positions being shown. In Figs. 8 and 9, a complete cycle is illustrated the positions being somewhat exaggerated in order to bring out as well as possible in a small drawing, the helical curve which defines the path of the centers of the driven lugs. Fig. 7 illustrates the fact that in whatever position of angularity assumed by the driven member, the lateral component of the driving force tending to return the driven member into line with the driving force is very small and is in fact neutralized by the opposite force exerted on the two sides of the line which represents the driving force.

Thus it will be seen that the wheel may be turned as in steering without overcoming a portion of the driving force. This is due to the design by reason of which all of the lugs are in driving contact in all positions of the parts.

Having described in detail the construction of the mechanism comprising the present invention, it now remains to set forth the operation thereof. Motion being transmitted to the axle 1, through the driving gear 2, it is apparent that the ball member 4, is rotated with the said axle. The ridges or extensions 16, of the socket member being fitted loosely within the recesses 7, of the ball member will receive motion from the ball member during the rotation of the latter, and as the wheel is secured to the said socket member, the latter serving in the capacity of the hub therefor, it is apparent that power is transmitted to the said wheel. When it is desired that the said wheel should be swung at an angle to the axle 1, the steering arm 16′, is actuated, and, as the said arm is connected to the socket or hub 8, the latter is swung at an angle to the axle 1, the elongated opening 22, permitting such movement, thereby rotating the wheel at the angle desired.

From the above, taken in connection with the accompanying drawings, it will be seen that the ball member 4, is incapable of rotation independent of the socket 8; that the enlargement 17, socket 8, and cap member 20, provide a casing for the said ball member 4, thereby protecting the latter as well as providing a dust-proof inclosure therefor; and that by the provision of the band or collar 18, a positive retaining element is provided whereby the socket 8, is maintained in frictional engagement with the enlargement 17, the said socket being rotatable independent thereof.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

I claim:

1. In mechanism of the class described, the combination of driving and driven members, inter-engaging lugs carried by said members, said lugs being generally ellipsoidal in outline, substantially as described.

2. In a device of the class described, the combination of a spherical driving member having surface lugs, a driven member having a spherical recess provided with inwardly projecting, generally ellipsoidal lugs, the lugs on the driving and driven members being so shaped that in their relative movement the edges of the lugs roll on each other, substantially as described.

3. In a device of the class described, the combination of a spherical driving member and a driven member having a spherical recess provided with inwardly projecting, generally ellipsoidal lugs, the parts being arranged to permit oscillation on a fixed axis transverse to the driving member, the lugs being so shaped that all thereof are in driving engagement in all positions of oscillation of the driven member, substantially as described.

4. In a device of the class described, the combination of a shaft having a spherical portion, a wheel having a portion adapted to fit over said spherical portion, said interfitting portions being provided with substantially ellipsoidal lugs, the edges of the lugs on one member engaging with the edges of the lugs on the coöperating member, and means permitting oscillation of the wheel on an axis transverse to the shaft, said inter-engaging lugs being so curved that the edges roll on each other during rotation of the wheel when in a position other than at right angles to the shaft, substantially as described.

5. In a device of the class described, the combination of a shaft having substantially a sphere thereon, said sphere being grooved peripherally to provide lugs the edges of which correspond in curvature to that of the sphere, the driven member fitting over said sphere and being adapted to oscillate thereon and provided with lugs, the edges of which are curved on a radius corresponding substantially to the radius of oscillation of the driven member relative to the driving member whereby the edges of said lugs are in contact in all positions of angularity of the driven member, substantially as described.

Signed at De Kalb, Illinois, this 19th day of January, 1918.

THOMAS SPACIE.

Witness:
ANTON H. FARBE.